F. H. EDMONDS.
MARKSMAN'S SPECTACLES.
APPLICATION FILED SEPT. 17, 1910.

1,003,889.

Patented Sept. 19, 1911.

Witnesses

Inventor
Frank H. Edmonds
By
Attorney

COLUMBIA PLANOGRAPH CO., WASHINGTON, D. C.

UNITED STATES PATENT OFFICE.

FRANK H. EDMONDS, OF WASHINGTON, DISTRICT OF COLUMBIA.

MARKSMAN'S SPECTACLES.

1,003,889. Specification of Letters Patent. Patented Sept. 19, 1911.

Application filed September 17, 1910. Serial No. 582,523.

*To all whom it may concern:*

Be it known that I, FRANK H. EDMONDS, a citizen of the United States, residing at Washington, District of Columbia, have invented certain new and useful Improvements in Marksmen's Spectacles; and I do hereby declare the following to be a full, clear, and exact description of the invention, such as will enable others skilled in the art to which it appertains to make and use the same.

This invention relates to improvements in spectacles especially spectacles for use by marksmen in sighting rifles and other firearms. The object of the invention being to provide marksmen's spectacles which have enlarged closely spaced lenses to bear at their inner ends directly on the nose and to extend at their outer ends outwardly beyond the eyes of the wearer to a considerable extent so as to remain in the line of vision when the head is turned to either side thereof, as when sighting a rifle, the lower inner portion of the enlarged left lens being shaped to fit one side of the nose and the lower side of the right lens being straight and considerably above the plane of the lower side of the left lens so as to be out of the path of the bolt of the rifle which moves rearwardly when the rifle is fired and hence obviate the danger of the breaking of the right lens by said rearwardly movable bolt of the rifle as hereinafter fully described and claimed.

A further object of the invention is to provide a construction of maximum strength and rigidity, wherein the lens frame will form in effect a continuation of the bridge and supplement it in holding the frame in place, while such strength will be given the entire structure as to insure it against breakage under the extremely hard usage to which the spectacles are put.

Figure 1:
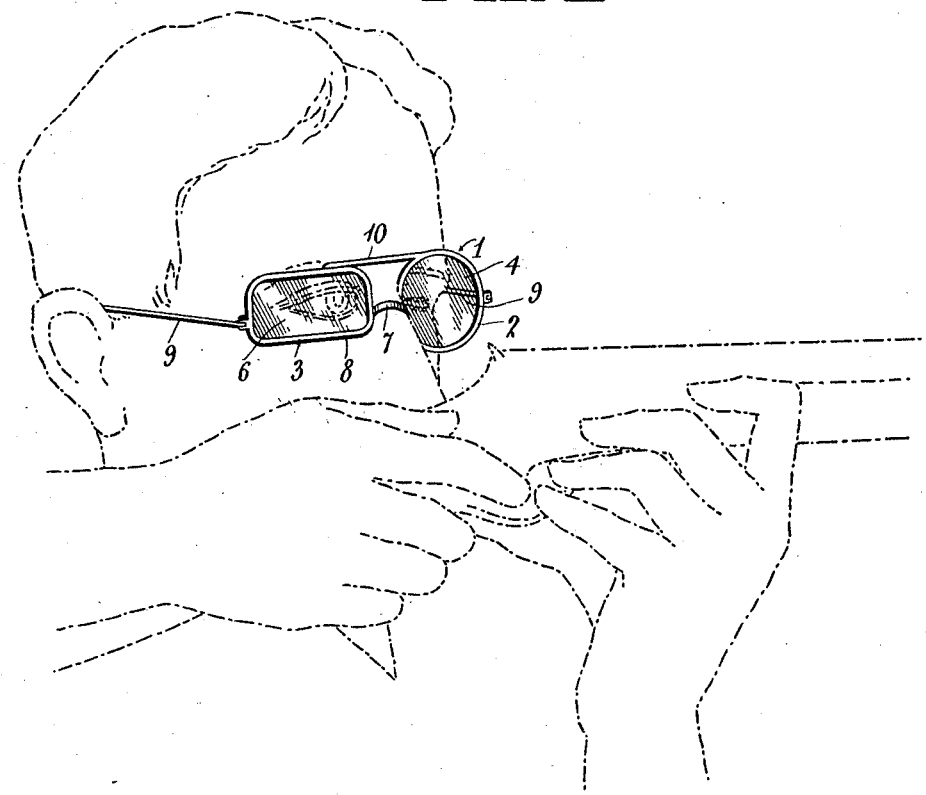
Figure 2:
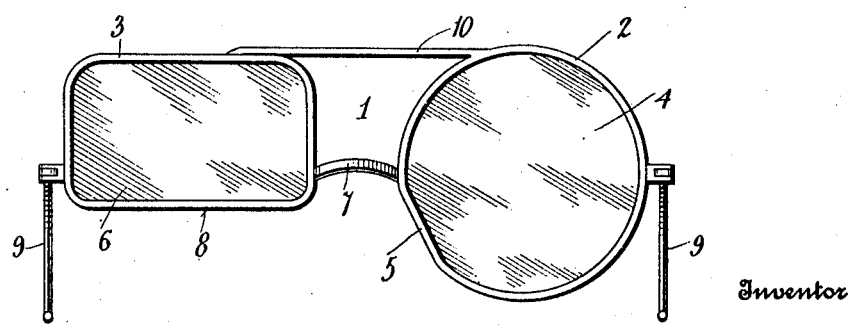

In the accompanying drawings: Figure 1 is a perspective view of a pair of spectacles embodying the present invention, the portion of a gun and the marksman using the gun and wearing the spectacles being shown in dotted lines. Fig. 2 is a front elevation of the spectacles.

My improved marksman's spectacles are here shown as provided with a frame 1 having lens rims 2—3. Within the scope of my invention however the portions of the frame which surround the lenses may be dispensed with and I do not limit myself in this particular.

The left lens 4 is considerably enlarged as compared with the lenses of ordinary spectacles and is substantially circular in form, the lower inner side thereof being shaped as at 5 to present an edge which conforms to the shape of and is adapted to bear directly against the left hand side of the nose of the wearer. The right lens 6 is spaced to only a comparatively slight extent from the left lens, the lenses being spaced and connected by the nose piece 7 which is short as compared with the nose piece of ordinary spectacles so that the inner ends or edges of the lenses bear directly on the nose at opposite sides thereof. The outer ends of the lenses extend outwardly beyond the eyes of the wearer to a considerable extent, owing to the length of the lenses and so the lenses by reason of their length, and their bearing directly on the nose remain in the line of vision when the head is turned to either side thereof as in the position assumed by a marksman in sighting a rifle. Hence when the head of the marksman is turned the outer end of one lens and the inner end of the other will be effective as aids to the sight and within the line of vision.

The right lens as illustrated, is substantially rectangular, save for the immediate corners which are rounded, the top, bottom and ends of the lens being straight and parallel in pairs. The bottom of the right lens approximately alines with the horizontal diameter of the left lens so that it is out of the way of the bolt of the rifle which moves rearwardly when the latter is fired.

There is thus produced an article which is durable to withstand the extremely hard usage to which this class of goods is subjected, while the specific shape and arrangement of the lenses and their frames with the bridge, is such as to effectually shade the eyes, to permit of flying back of the bolt of the fire-arm and to hold the spectacles firmly upon the nose of the user.

Having thus described my invention I claim:—

A pair of spectacles comprising a pair of lens frames having lenses filling them respectively, a bridge connecting the frames, and temple pieces connected with the frames, one of said lenses having straight top, bottom and ends, the bottom approximately alining with the center of the other lens, the latter with its frame being flattened at its lower inner side from the corresponding end of the bridge and at such an angle to the latter as to rest therewith against the nose of the wearer.

In testimony whereof, I affix my signature, in presence of two witnesses.

FRANK H. EDMONDS.

Witnesses:
EDWARD F. RIGGS,
R. E. GIBSON.

Copies of this patent may be obtained for five cents each, by addressing the "Commissioner of Patents, Washington, D. C."